UNITED STATES PATENT OFFICE 2,248,827

DIALKYL-CYCLOHEXYL-PHENOLS

Donald R. Stevens, Swissvale, and William A. Gruse, Wilkinsburg, Pa., assignors to Gulf Research & Development Company, Pittsburgh, Pa., a corporation of Delaware No Drawing. Application April 11, 1938,
Serial No. 201,457

5 Claims. (Cl. 260—619)

This invention relates to dialkyl-cyclohexyl-phenols; and it comprises as new compounds the 2,4,6-tri-substituted phenols in which two of the substituents are alkyl groups and the third substituent is a cyclohexyl group, which compounds are soluble in oil and possess the property of inhibiting oxidational changes in organic materials; all as more fully set forth hereinbelow and as claimed.

We have discovered a new class of compounds all of which possess antioxidant properties, and are soluble in hydrocarbon oil products and may or may not be soluble in water and in dilute aqueous alkali solutions. Furthermore these compounds have relatively high boiling points and can be readily isolated in substantially pure form. Because of the combination of properties which the compounds of our invention possess, they are particularly valuable for use as antioxidants in the stabilizing of various organic substances including particularly hydrocarbon oil products such as cracked gasoline, lubricating oils, turbine oils, transformer oils and the like when added thereto in relatively small amounts.

The compounds of our invention are the 2,4,6-tri-substituted-mono-hydroxy phenols, in which two of the substituents are alkyl groups and the third substituent is a carbocyclic group containing six carbon atoms. The carbocyclic group may occupy the position ortho to the hydroxyl group, in which case one alkyl group is ortho and the other alkyl group is para to the hydroxyl; or the carbocyclic group may occupy the position para to the hydroxyl group, in which case both alkyl groups will occupy positions ortho to the hydroxyl group, as is illustrated by the following structural formulae:

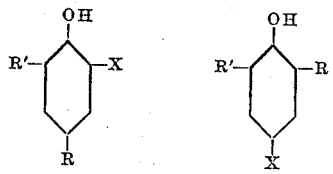

in which X represents a carbocyclic group such as a cyclohexyl or a phenyl group, while R and R' represent the same or dissimilar alkyl groups such as the methyl, ethyl, propyl, butyl, amyl or higher alkyl groups.

In general we have found these compounds may be produced by various methods. They may for example be formed by direct alkylation of a suitable carbocyclic substitution product of a mono-hydroxy phenol. Or they may be synthesized by condensation of a di-alkyl phenol with a carbocyclic compound for instance by the Friedel and Crafts synthesis.

In most cases we have found it simpler and more economical to produce these compounds by direct alkylation of a carbocyclic substitution product of a phenol in the presence of an acid catalyst. For example, we have been able by treating para-cyclo-hexyl-phenol with isobutylene in the presence of an acid condensing agent such as sulfuric acid under suitable conditions of temperature and pressure, to produce 2,6-di-tertiary-butyl-4-cyclohexyl-phenol. Similarly using as a starting material ortho-cyclo-hexyl-phenol, we have produced under the same conditions 4,6 di-tertiary-butyl-2-cyclo-hexyl-phenol. We have also produced the corresponding amyl compounds including 2,6-di-tertiary-amyl-4-cyclo-hexyl-phenol and 4,6-di-tertiary-amyl-2-cyclo-hexyl-phenol by treating the para- and ortho-cyclo-hexyl-phenols respectively with iso-amylene or tri-methyl-ethylene in the presence of an acid condensing agent. Also we have been able to produce 2,4-di-tertiary-butyl-6-phenyl phenol and 2,6-di-tertiary-butyl-4-phenyl phenol by alkylation of ortho and para-hydroxy-diphenyl respectively.

In alkylating the ortho- or para-cyclo-hexyl-phenols for example with isobutylene or tri-methyl-ethylene to produce 4,6-di-tertiary-butyl-2-cyclo-hexyl-phenol, 2,6-di-tertiary-butyl-4 cyclo-hexyl-phenol, 4,6-di-tertiary-amyl-2-cyclo-hexyl-phenol or 2,6-di-tertiary-amyl-4-cyclo-hexyl-phenol, respectively, conditions favoring the production of the desired compound in high yield in general include the use of ordinary commercial concentrated sulfuric acid in amounts corresponding to about 5 per cent by weight of the cyclo-hexyl-phenol employed. When less acid is used the reaction rate may be inconveniently slow and when greater amounts of acid are used there may be a tendency toward polymerization of the olefin instead of alkylation of the phenol. The reaction temperature under these conditions is preferably maintained at about 70° C., although in some cases lower temperatures may be used.

The alkylation of para-hydroxy-diphenyl, for example with isobutylene, for the production of 2,6-di-tertiary-butyl-4-phenyl-phenol generally requires somewhat more drastic reaction conditions than the alkylation of the cyclo-hexyl-phenols. When using a sulfuric acid catalyst in an amount corresponding to about 5 per cent of the hydroxy-diphenyl, we have found it desirable in order to effect the alkylation in a conveniently short time to operate at elevated temperatures and pressures, and we have obtained good yields by heating for about 1 hour at a temperature of about 150° C., and a pressure of 200 pounds per square inch.

Other compounds containing lower or higher alkyl groups than are contained in the above recited compounds may also be produced by direct alkylation. In some cases, however, we have found it convenient to use other methods of synthesis. For example, we have been able to produce 2,6-di-methyl-4-cyclo-hexyl phenol by means of the Friedel-Craft's reaction using as starting materials 2,6-dimethyl phenol and cyclohexyl chloride.

While all of the compounds of our invention may be used as antioxidants for the prevention of oxidational changes in organic materials, we have found that the properties of some of these compounds make them more desirable than others for this use. We have found that the 2,4,6-tri-substituted mono-hydroxy phenols in which two of the substituent groups are alkyl groups and the third substituent is a carbocyclic group, and in which, in a position ortho to the hydroxyl group, there is at least one alkyl group containing three or more carbon atoms, are substantially insoluble in water and in dilute aqueous alkali solution. This combination of properties together with their oil solubility and their property of inhibiting oxidation, makes these latter compounds particularly suitable for use as antioxidants. Their insolubility in water prevents their removal from gasoline or oil containing them, when in contact with water, and their insolubility in dilute aqueous alkali solution permits their addition to cracked gasoline at an early stage in the process of production, prior to the usual alkali-washing step, which increases their effectiveness as antioxidants.

In the following examples there are illustrated the production of various compounds of my invention and their use as antioxidants. In all cases the oxygen stability periods recited in the following examples were determined by the method of Hunn, Fischer and Blackwood, J. Soc. Automotive Eng. 2, 31 (1930).

*Example 1*

500 parts by weight of ortho-cyclo-hexyl-phenol (M. P. 50° to 55° C.) and 25 parts by weight of commercial concentrated sulfuric acid were placed in a vessel and heated to a temperature of about 70° C. at which temperature the mixture was liquid. Isobutylene gas was introduced slowly into this mixture with agitation until it was no longer taken up in substantial amounts. The reaction mixture was washed, while still hot, with an equal volume of a hot dilute aqueous alkali solution. An oily liquid was separated from the aqueous alkali wash, and on cooling it crystallized into a thick magma of grayish crystals. On recrystallization from alcohol pure white crystals were recovered as a fine powder.

This crystalline product had a melting point of 80° C., was substantially insoluble in dilute aqueous alkali solution and in water and was substantially oil-soluble. The ultimate analysis of the product compared with the theoretical composition of 4,6-di-tertiary-butyl-2-cyclo-hexyl-phenol, was as follows:

| Ultimate analysis | Found for product | Calculated for 4,6-di-tertiary butyl-2-cyclo-hexyl-phenol |
|---|---|---|
| Carbon | 83.10 | 83.33 |
| Hydrogen | 11.24 | 11.11 |
| Oxygen | 5.66 | 5.56 |

When 0.05 per cent by weight of this 4,6-di-tertiary-butyl-2-cyclo-hexyl-phenol product was added to a standard reference gasoline having an oxygen stability period of 1½ hours, the stability period was increased to 4½ hours.

*Example 2*

500 parts by weight of para-cyclo-hexyl-phenol (M. P. 129° to 131° C.) and 25 parts by weight of commercial concentrated sulfuric acid were placed in a reaction vessel. Isobutylene was slowly introduced into the mixture and the alkylation reaction commenced immediately with the evolution of considerable heat. The relatively small amount of sulfuric acid is not sufficient to wet all of the crystals of the phenol, but that portion near the gas inlet which is wet by the acid reacts and the reaction proceeds gradually throughout the mass, the crystals of para-cyclo-hexyl-phenol gradually disappearing and the whole reaction mixture gradually becoming liquid. As soon as the reaction mixture became sufficiently fluid, it was agitated to promote the reaction. The temperature was maintained at about 70° C. The introduction of isobutylene was continued until the reaction was substantially complete. The liquid reaction product was then washed hot with an equal volume of a dilute aqueous alkali solution. An oily liquid was separated from the aqueous alkali wash and on cooling it crystallized to form a magma of grayish crystals. On recrystallization from alcohol, pure white tetragonal crystals were recovered, which had a melting point of 110° C., and were insoluble in water and in dilute aqueous alkali solution, but substantially soluble in oil. This crystalline product had an ultimate analysis which compared with the theoretical composition of 2,6-di-tertiary-butyl-4-cyclo-hexyl-phenol as follows:

| Ultimate analysis | Found for product | Calculated for 2,6-di-tertiary-butyl-4-cyclo-hexyl-phenol |
|---|---|---|
| | *Percent by weight* | *Percent by weight* |
| Carbon | 83.05 | 83.33 |
| Hydrogen | 11.33 | 11.11 |
| Oxygen | 5.62 | 5.56 |

When 0.05 per cent by weight of this 2,6-di-tertiary-butyl-4-cyclo-hexyl-phenol product was added to a standard reference gasoline having an oxygen stability period of 1½ hours, the stability period was increased to 7½ hours.

The effectiveness of our 2,6-di-tertiary-butyl-4-cyclo-hexyl-phenol product in retarding oxidation in lubricating oils is illustrated in the following comparative test. In this test a sample of a highly refined lubricating oil and another sample of the same oil to which 0.2 per cent by weight of the 2,6-di-tertiary-butyl-4-cyclohexyl-phenol product has been added were each subjected to a 45 hour test run in the crank case of a test engine under standard operating conditions calculated to accelerate oxidation. The test engine employed is a single cylinder automobile proto-type engine of valve-in-head design. The crank shaft bearing is of standard Babbitt metal and the oil capacity of the crank case is 1500 cc. The crank case is surrounded by an insulated chamber containing electrical heaters, so that the air between the walls of the chamber and the crank case can be used to control the temperature in the crank case. In operation the engine is coupled to a standard electrical dynamometer and runs at full throttle 1300 R. P. M., delivering 5.75 brake horse power During the test the air around the crank case was maintained at 300° F., which maintained the temperature of the oil in the crank case at about 280° F. Air was introduced into the crank case at a rate of about 6 liters per hour. The results of the test are shown in the following table:

| Characteristics | Oil before test | Oil after test | Oil+0.2% of antioxidant product after test |
|---|---|---|---|
| Saybolt viscosity: | | | |
| 100° F | 360 | 645 | 402 |
| 210° F | 57.5 | 73.8 | 60.5 |
| Carbon residue | 0.14 | 1.5 | 0.33 |
| Neutralization No | 0.06 | 5.8 | 0.3 |
| Saponification No | | 9.5 | 2.2 |

*Example 3*

500 parts by weight of ortho-cyclo-hexyl-phenol (M. P. 50 to 55° C.) were placed in a reaction vessel with 25 parts by weight of commercial concentrated sulfuric acid. The mixture was heated to about 70° C. at which temperature the mixture was liquid. Warm tri-methyl-ethylene vapor was introduced into the liquid mixture at a moderate rate and with agitation of the mixture, until the reaction was complete. The reaction mixture was then "weathered" with an inert gas at slightly elevated temperatures to remove any hydrocarbon polymers and excess trimethyl ethylene. It was then washed with an equal volume of dilute aqueous caustic soda solution (10 per cent) and an oily amber colored liquid was separated from the aqueous wash. This oily liquid on distillation at an absolute pressure of 5 mm., distilled over at 177° C. This product was a colorless syrupy liquid having a specific gravity of 0.9545 and a refractive index of 1.4969 and was soluble in oil and insoluble in water and dilute aqueous alkali solution. The ultimate analysis of the product as compared with the theoretical composition of 4,6-di-tertiary-amyl-2 cyclo-hexyl-phenol is shown in the following table:

| Ultimate analysis | Found for product | Calculated for 4,6-di-tertiary-amyl-2-cyclo-hexyl-phenol |
|---|---|---|
| | Percent by weight | Percent by weight |
| Carbon | 82.95 | 83.54 |
| Hydrogen | 11.44 | 11.39 |
| Oxygen | 5.61 | 5.07 |

When this 4,6-di-tertiary-amyl-2-cyclo-hexyl-phenol product was added in the proportion of 0.04 gram per 100 cc. to a standard reference gasoline having an oxygen stability period of 1½ hours, the oxygen stability period was increased to 3¾ hours.

*Example 4*

In the production of 2,6-di-tertiary-amyl-4-cyclo-hexyl-phenol, 500 parts by weight of para-cyclo-hexyl-phenol (M. P. 129° to 131° C.) and 25 parts by weight of commercial concentrated sulfuric acid were placed in a reaction vessel and heated to about 70° C. Warm trimethyl ethylene vapor was introduced into the reaction mixture at a moderate rate. The reaction started near the gas inlet and proceeded throughout the mass, which gradually became liquid. After the mixture had become sufficiently fluid it was agitated to promote completion of the reaction. After the reaction was complete, the flow of iso-amylene vapor into the vessel was stopped and the reaction mixture was "weathered" to remove any unreacted amylene and amylene polymers by passing a heated inert gas through the mixture. The mixture was then washed hot with an equal volume of a dilute aqueous solution of caustic soda and an oily amber colored liquid was separated from the alkali wash. This liquid on distillation at a pressure of 4 to 5 mm. yielded a constant boiling fraction at 185° C. which was a colorless, syrupy liquid having a specific gravity of 0.9505 and a refractive index of 1.4960 and was soluble in oil and insoluble in water and in dilute aqueous alkali solution. The ultimate analysis of the product as compared with the theoretical composition of 2,6-di-tertiary-amyl-4-cyclo-hexyl-phenol is shown in the following table:

| Ultimate analysis | Found for product | Calculated for 2,6-di-tertiary-amyl-4-cyclo-hexyl-phenol |
|---|---|---|
| | Percent by weight | Percent by weight |
| Carbon | 83.26 | 83.54 |
| Hydrogen | 11.62 | 11.39 |
| Oxygen | 5.12 | 5.07 |

When this 2,6-di-tertiary-amyl-4-cyclo-hexyl-phenol product was added in the proportion of 0.04 gram per 100 cc. to a standard reference gasoline having an oxygen stability period of 1½ hours, the oxygen stability period was increased to 5¾ hours.

*Example 5*

In the production of 2,6-di-tertiary-butyl-4-phenyl-phenol 30 parts by weight of 4-hydroxy-diphenyl, 1.5 parts by weight of commercial concentrated sulfuric acid saturated with ammonium sulfate and 80 parts by weight of isobutylene were placed in a pressure vessel and heated for 1 hour at a temperature of 150° C. and a gauge pressure of 200 pounds. The resulting mixture was washed with dilute aqueous alkali solution and about 70 parts by weight of an oily product was separated from the aqueous wash. This product on fractional distillation yielded 18 parts by weight of polymerized olefin and 52 parts by weight of crude 2,6-di-tertiary-butyl-4-phenyl-phenol in the form of a thick amber oil having a boiling point of 104° to 105.5° C. at a pressure of 0.012 to 0.017 mm., and a specific gravity of 1.0442 and a refractive index of 1.4982. The ultimate analysis of this product as compared with the theoretical composition of 2,6-di-tertiarybutyl-4-phenyl-phenol is shown in the following table:

| Ultimate analysis | Found for product | Calculated for 2,6-di-tertiary-butyl-4-phenyl-phenol |
| --- | --- | --- |
| | Percent by weight | Percent by weight |
| Carbon | 85.10 | 85.32 |
| Hydrogen | 9.22 | 8.81 |
| Oxygen | 5.69 | 5.87 |

When this 2,6-di-tertiary-butyl-4-phenyl-phenol was added, in amounts corresponding to about 0.04 gram per 100 cc., to a standard reference gasoline having an oxygen stability period of 1½ hours, the oxygen stability period was increased to 5 hours.

*Example 6*

In the production of 2,4-di-tertiary-butyl-6-phenyl-phenol, 25 parts by weight of 2-hydroxy-diphenyl and 1.25 parts by weight of commercial concentrated sulfuric acid were placed in a reaction vessel and heated to 60° C. Pure iso-butylene was added to the mixture with vigorous agitation until no further increase in the weight of the mixture was produced. During the addition of the isobutylene the reaction mixture was cooled to maintain its temperature below about 60° C. The resulting reaction mixture was washed with dilute aqueous alkali solution and water. This product on fractional distillation yielded about 27.4 parts by weight of an oil having a boiling point at 5 mm. pressure of 158° C., a specific gravity of 1.0150 and a refractive index of 1.4898, and being insoluble in water and in dilute aqueous alkali solution. The ultimate analysis of my product as compared with the theoretical composition of 2,4-di-tertiary-butyl-6-phenyl-phenol is shown in the following table:

| Ultimate analysis | Found for product | Calculated for 2,4-di-tertiary-butyl-6-phenyl-phenol |
| --- | --- | --- |
| | Percent by weight | Percent by weight |
| Carbon | 85.08 | 85.10 |
| Hydrogen | 9.22 | 9.10 |
| Oxygen | 5.70 | 5.80 |

When this 2,4-di-tertiary-butyl-6-phenyl-phenol product is added, in amounts corresponding to about 0.04 gram per 100 cc., to a standard reference gasoline having an oxygen stability period of 1½ hours, the oxygen stability period is increased to 2½ hours.

*Example 7*

In this example there is illustrated the production of 2,6-di-methyl-4-cyclo-hexyl-phenol by a Friedel-Craft's synthesis. 23 parts by weight of cyclo-hexyl chloride were added slowly to a mixture containing 20 parts by weight of 2,6-di-methyl-phenol and 4.6 parts by weight of anhydrous aluminum chloride. The reaction mixture was maintained at a temperature of about 60° C., and was stirred for one hour. The mixture was then cooled, diluted with about 90 to 130 parts by weight of benzene and was washed with water until neutral. The solution thus obtained was dried over anhydrous sodium sulfate and fractionally distilled under reduced pressure. The product obtained was an amber colored liquid having a boiling point of 145°–155° C. at 5 mm. pressure. It was slightly soluble in water and in dilute aqueous alkali solution and had a specific gravity of 1.0185 and a refractive index of 1.4962. The carbon and hydrogen content of the product on ultimate analysis compared well with the theoretical composition calculated from the formula of 2,6-di-methyl-4-cyclo-hexyl phenol.

When this product was added in the proportion of 0.04 gram per 100 cc. to a standard reference gasoline having an oxygen stability period of 1½ hours, the oxygen stability period was increased to 5 hours.

What we claim is:

1. A 2,4,6-tri-substituted phenol in which two of the substituents are alkyl groups and the third substituent is a cyclo-hexyl group.
2. A 2,4,6-tri-substituted phenol in which two of the substituents are alkyl groups, at least one of which contains at least three carbon atoms and occupies a position ortho to the hydroxyl group and the third substituent is a cyclo-hexyl group.
3. 2,6-di-tertiary-butyl-4-cyclohexyl-phenol.
4. 4,6-di-tertiary-butyl-2-cyclohexyl phenol.
5. 2,6-di-tertiary-amyl-4-cyclohexyl phenol.

DONALD R. STEVENS.
WILLIAM A. GRUSE.